Patented Sept. 2, 1941

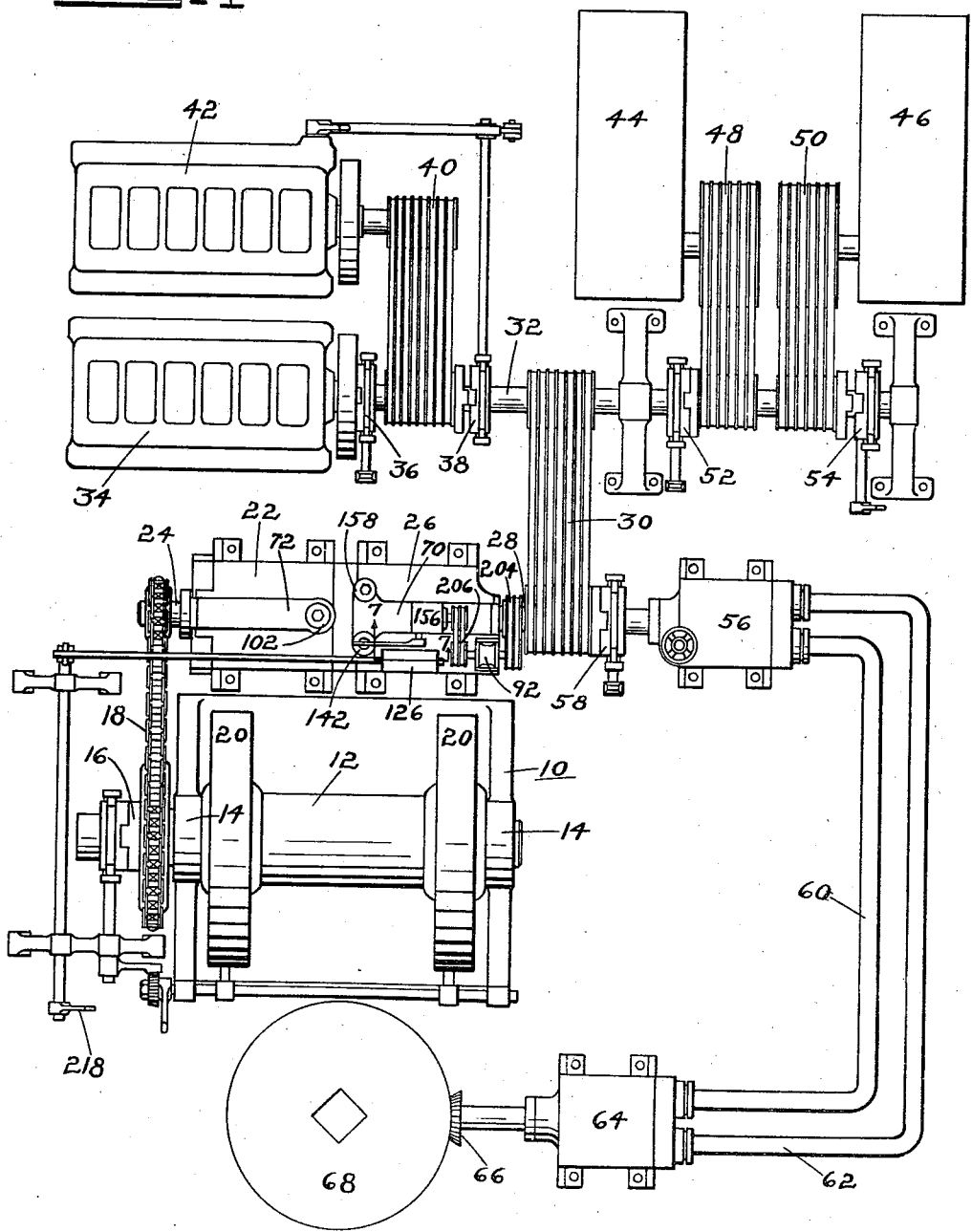

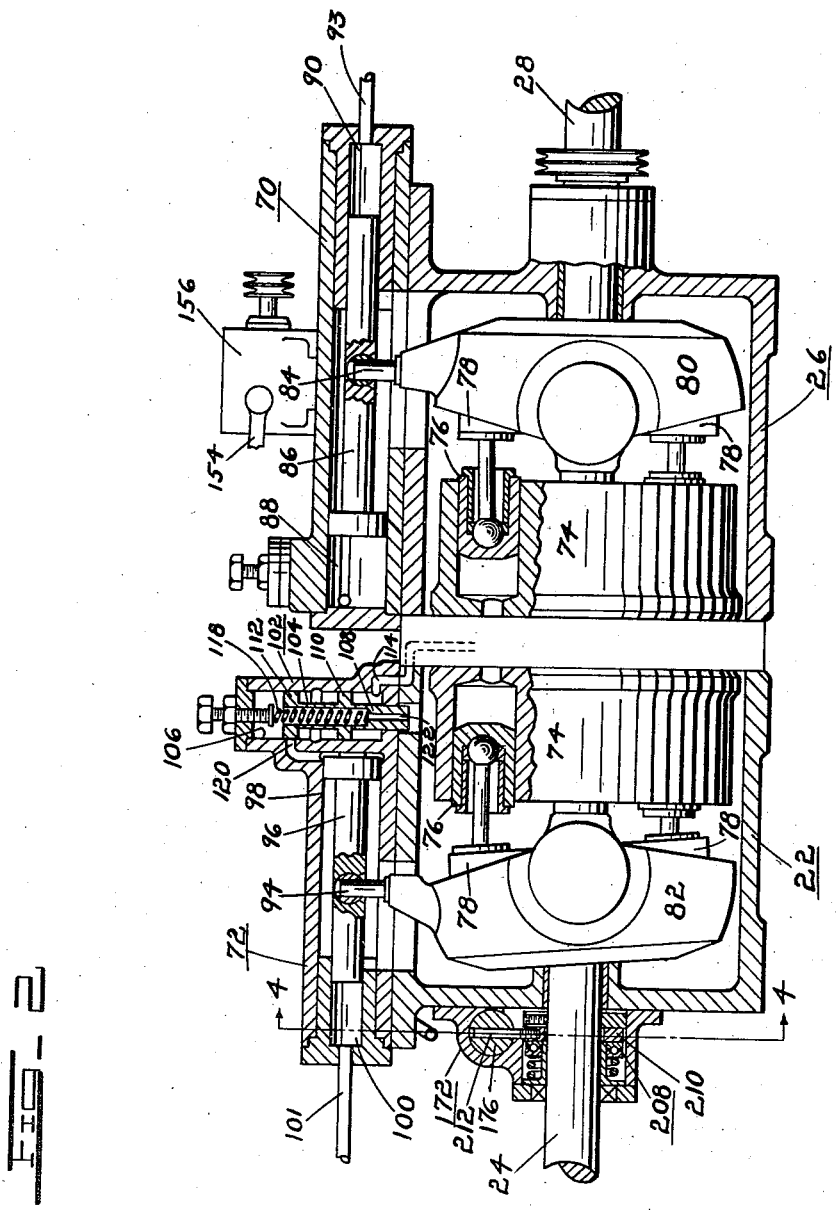

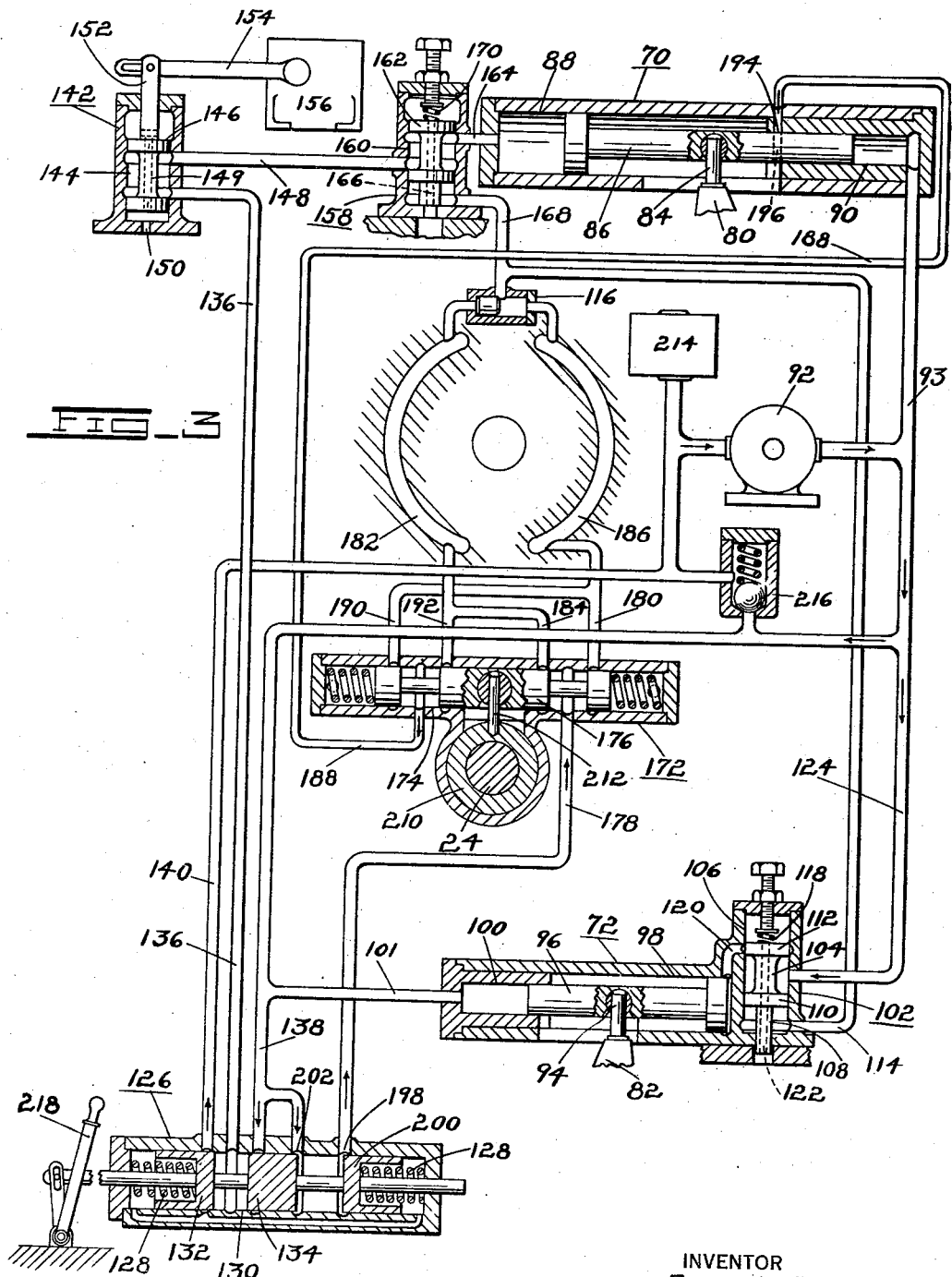

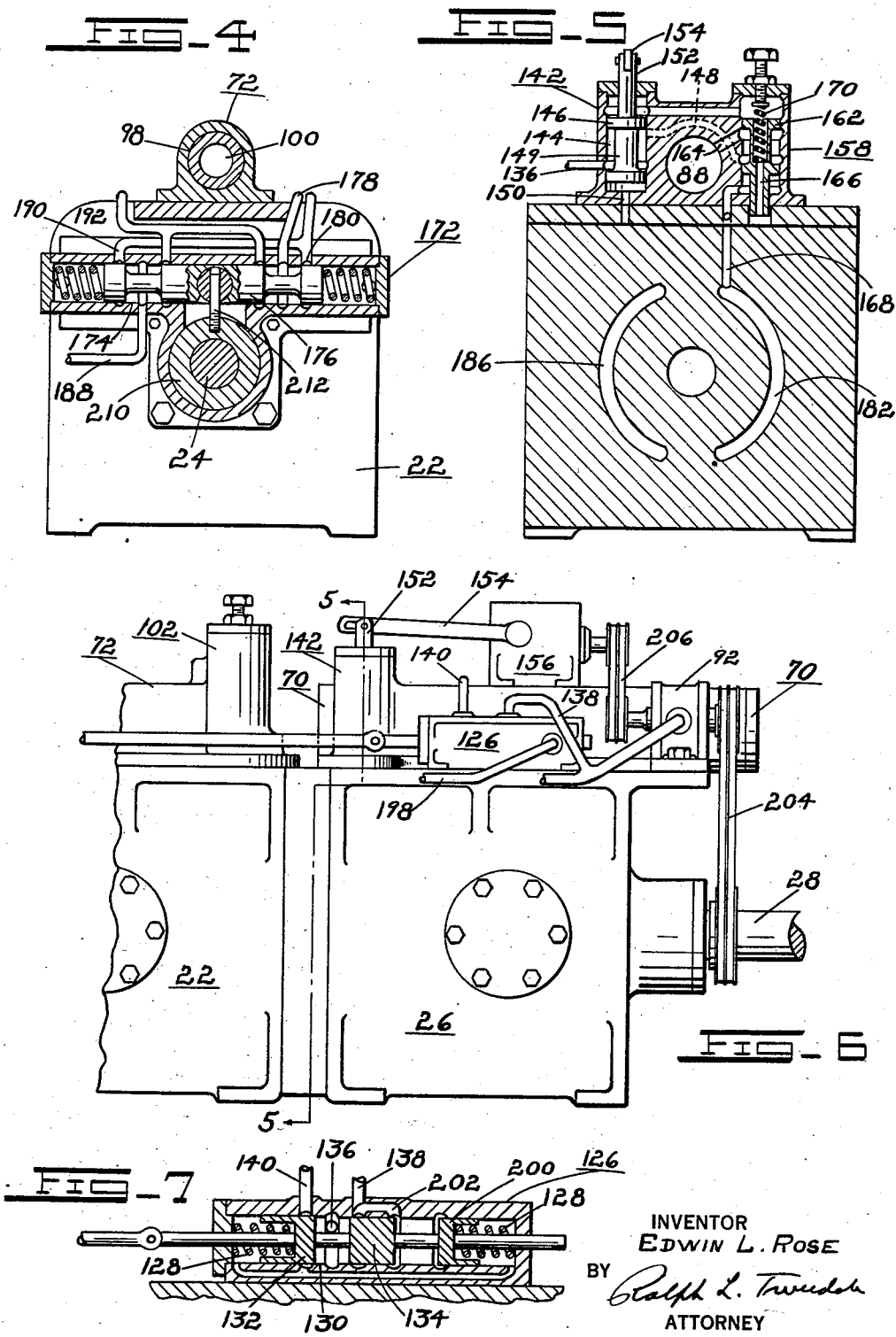

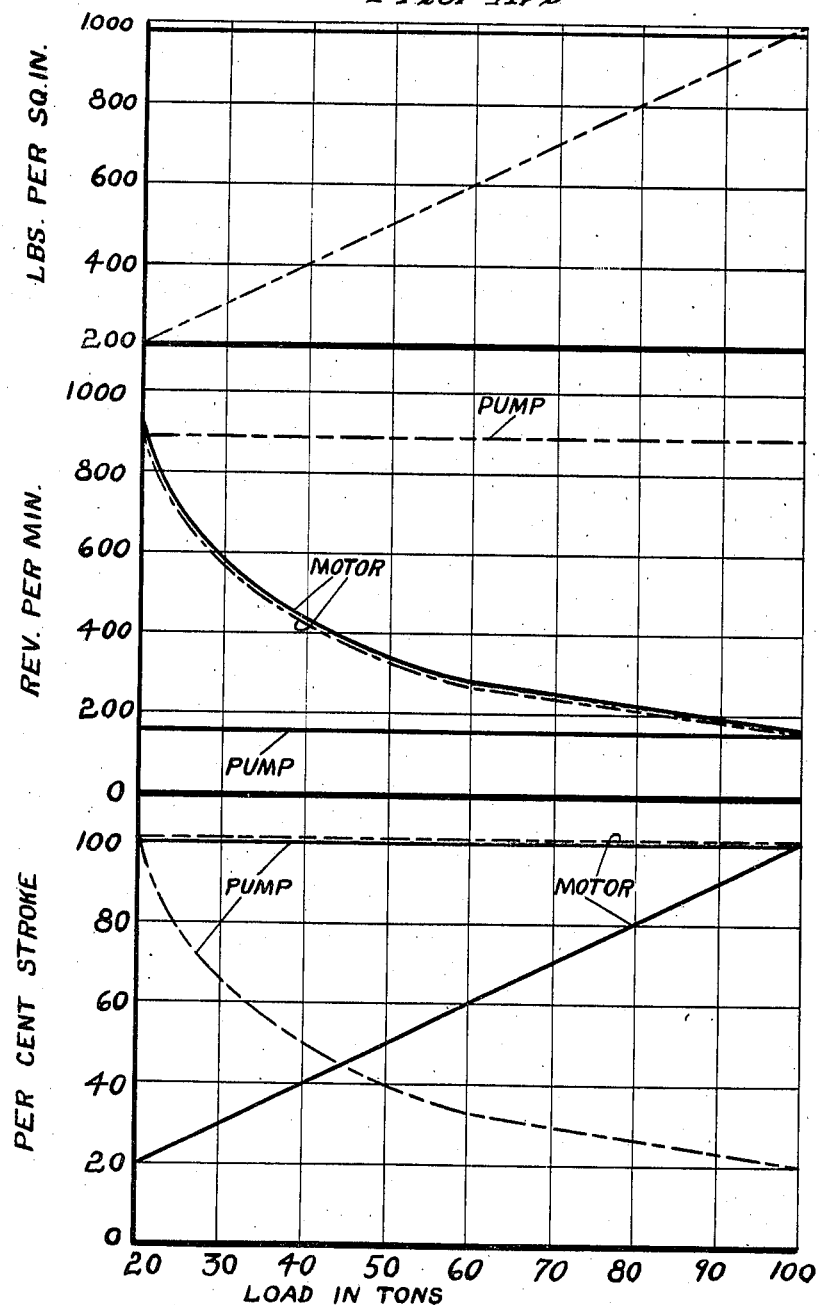

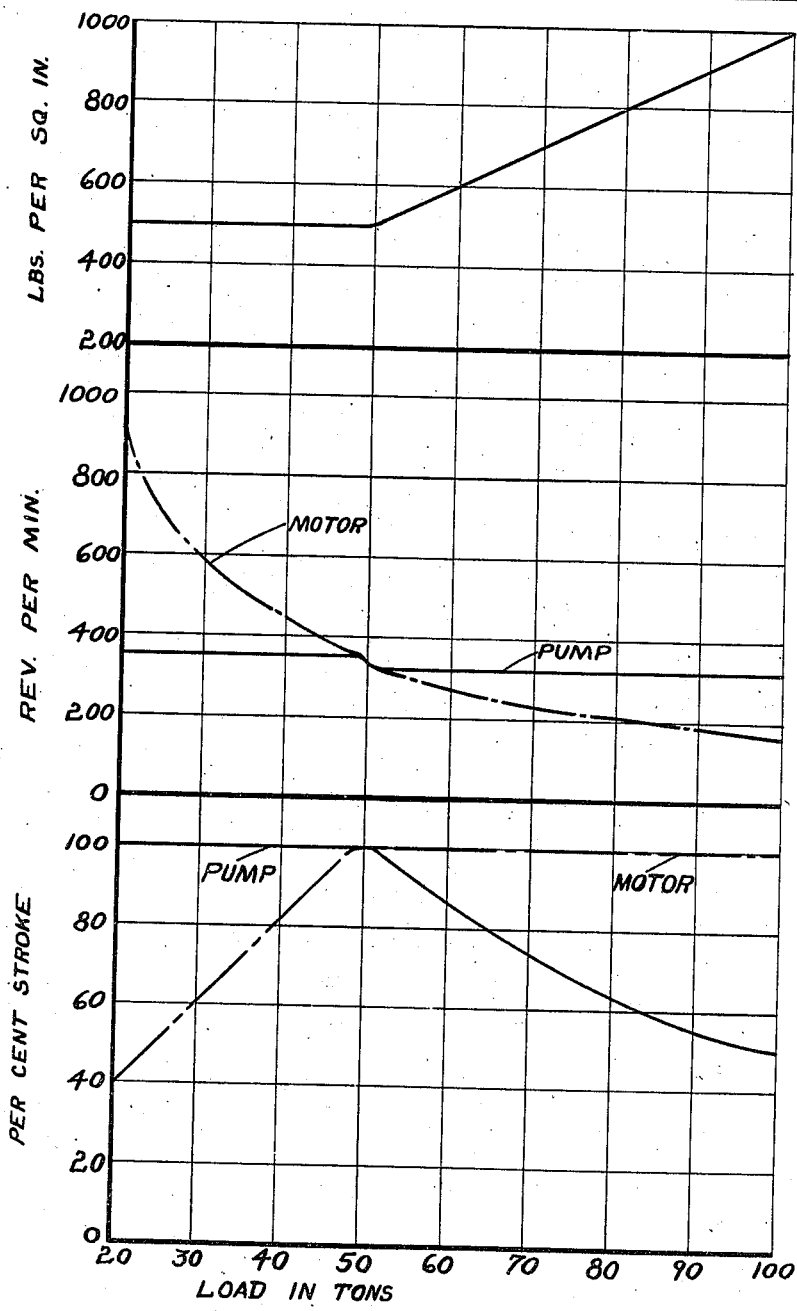

2,254,319

UNITED STATES PATENT OFFICE 2,254,319

POWER TRANSMISSION

Edwin L. Rose, Waterbury, Conn., assignor to The Waterbury Tool Company, Waterbury, Conn., a corporation of Connecticut Application June 17, 1936, Serial No. 85,629

7 Claims. (Cl. 254—173)

This invention relates to power transmissions and particularly to transmissions of the hydraulic type comprising a fluid pump and fluid motor either or both of which may be provided with mechanism for varying its displacement in order to vary the speed ratio betwen the prime mover which operates the pump and the load device which the motor operates. The invention is illustrated as adapted for use in a well drilling rig of well-known type in which a string of drill stem is caused to revolve by a rotary drilling head while a portion of the weight of the string rests upon the earth formation at the bottom of the hole being drilled, the remainder being suspended on a block and falls mounted in a drilling derrick and connected to a draw-works drum.

In earth boring operations of this general class it is necessary from time to time as the work progresses to retract the drill stem from the hole for the purpose of replacing the cutting bit at the lower end of the drill stem. In so doing it is necessary to stop the rotational movement of the drill stem and hoist the stem a suitable distance to near the top of the derrick, this distance usually being 90 feet, and to grip the stem at the rotary table and remove the section of the drill stem projecting above the table. The hoisting apparatus is then lowered and connected to the remaining portion of the stem projecting from the rotary table and hoisted another 90 feet and the operation is repeated until the entire string is removed from the hole. After necessary repairs to the bit are made, by reversing this process the bit may be again brought to working position at the bottom of the hole.

In many drilling operations of this nature it is of prime importance that the hole be cut down to its intended depth in the least possible total lapsed time. Inasmuch as normal drilling operations are suspended while the drill string is being retracted and replaced for repair purposes, it is essential to keep the time consumed for this purpose to a minimum and it is customary to provide prime movers of several times the power output required for drilling operations so that the string may be retracted at a maximum speed and lost time reduced to a minimum. It will be seen that in retracting the string the weight of the string and the load to be lifted is progressively reduced as each section of drill stem is detached from the sections below it so that at each hoist of 90 feet the load to be hoisted is reduced by the weight of the 90-foot section of drill stem.

For a given maximum horsepower of the prime mover and a given weight of drill string there is only one speed ratio between the prime mover and the draw-works drum which will permit the string to be retracted at a speed which utilizes the full power of the prime mover. It is obviously impractical to provide direct mechanical gearing between the prime mover and the draw-works drum with sufficient speed ratios to permit full power hoisting of the stem at each 90-foot hoist. In drilling rigs in general use heretofore variable speed chains and sprockets or spur gearing have been provided with usually 4 or 6 available speed ratios and the operator has selected the highest drive ratio which will permit the prime mover to hoist the stem without stalling. With this construction it is necessary to use one speed ratio for a considerable number of consecutive hoists of the drill stem before the drill stem weight is reduced sufficiently to enable the operator to shift to the next higher ratio. It will be seen that with this method of operation the speed of hoisting is the same for several consecutive hoists of the drill stem and inasmuch as the weight of the stem is reduced at each hoist, the full power of the prime mover can be utilized only on the first hoist at a given ratio and that thereafter the power load on the prime mover progressively decreases.

It is an object of the present invention to provide a draw-works drive for a well drilling rig whereby the ratio of power transmission between the prime mover and the draw-works drum may be adjusted to the value necessary to utilize the full power output of the prime mover at each hoist of the drill stem.

A further object is to provide a draw-works drive of such character wherein an operator-controlled member may be moved to cause the draw-works drum to rotate in hoisting direction and wherein automatic means beyond the control of the operator acts to select the proper ratio of power transmission necessary to utilize the full power output of the prime mover for any given weight of drill stem.

Certain aspects of the present invention are not limited to the well drilling field but are of general application to hydraulic transmissions irrespective of the driving and driven apparatus with which they may be associated. In determining the size of fluid pump and fluid motor necessary to transmit a given horsepower over any selected range of speed ratios, there are certain important limiting factors which have heretofore prevented full utilization of this type of power transmission, particularly in applications requiring the transmission of a constant horsepower over a wide range of speed ratio variation.

A further object of the present invention is to provide a hydraulic power transmission which is operable at constant horsepower over a considerably wider range of speed ratios than has heretofore been possible under a similar set of conditions.

Further objects and advantages of the present invention will be apparent from the following description, reference being had to the accompanying drawings wherein a preferred form of the present invention is clearly shown.

In the drawings:

Fig. 1 is a plan view of a well drilling rig embodying a preferred form of the present invention.

Fig. 2 is a longitudinal cross section of a variable speed hydraulic transmission employed in the apparatus illustrated in Fig. 1.

Fig. 3 is a diagrammatic view of a hydraulic control circuit associated with the power transmission of Fig. 2.

Fig. 4 is a cross section on line 4—4 of Fig. 2.

Fig. 5 is a cross section on line 5—5 of Fig. 6.

Fig. 6 is a side view of a portion of the hydraulic transmission.

Fig. 7 is a fragmentary cross section on line 7—7 of Fig. 1.

Fig. 8 is a plot of the operating characteristics of a hydraulic transmission illustrating the prior art methods of operating at constant horsepower.

Fig. 9 is a plot similar to Fig. 8 illustrating the operating characteristics of the present invention.

Referring now to Fig. 1 there is illustrated a draw-works 10 having a main drum 12 mounted in bearings 14 adapted to be driven through a jaw clutch 16 and a chain and sprocket drive 18. The draw-works may be provided with brake bands 20 and with the other usual accessory apparatus thereto such as cat-head shaft, etc., not illustrated. The draw-works preferably comprises but a single sprocket and chain drive 18 between the drum 12 and a fluid motor 22 having an output shaft 24 with which the chain and sprocket drive is directly connected. A fluid pump 26 is associated with the motor 22 in a manner to drive the same so that the pump and motor together comprise a variable speed hydraulic transmission. The pump 26 has an input shaft 28 on which is mounted a pulley forming part of a multiple belt drive 30 by which power is transmitted from a power shaft 32 to the pump shaft 28.

The power shaft 32 is connected to the output shaft of a prime mover 34, for example a Diesel engine, through the medium of a jaw clutch 36 and is also adapted to be connected through a jaw clutch 38 to a multiple belt drive 40 by which the shaft 32 may be driven from a second Diesel engine prime mover 42. The shaft 32 is adapted to drive selectively either or both of a pair of slush pumps 44 and 46 through the medium of belt drives 48 and 50 and jaw clutches 52 and 54. A second hydraulic pump 56 of variable displacement type may be driven from the belt drive 30 through the medium of a jaw clutch 58 and is connected by conduits 60 and 62 to a fixed displacement fluid motor 64 which is directly connected to the bevel pinion 66 of a rotary drilling table 68. The draw-works 10 and the drilling table 68 are preferably mounted adjacent the base of a drilling derrick, not shown, the table 68 driving a drill stem through the medium of the usual Kelly and the draw-works drum 12 having wound thereon the cable line by which the drill stem is raised and lowered through the usual block and falls rigging. The slush pumps 44 and 46 are connected by suitable piping and valves, not shown, to the mud circulating system by which mud is circulated downwardly through the hollow drill stem to the cutting bit and returned around the outside of the stem to a mud reservoir.

In determining the size of the fluid pump 26 and fluid motor 22 which is necessary to transmit a given constant horsepower over any selected range of speed ratios, the design of the pump and motor impose certain limitations which have heretofore required the use of a prohibitive size hydraulic transmission for an application such as the draw-works drive of the present invention. Any given design of transmission has a limit both to the speed at which it may be operated and the working pressure to which it may be subjected. Such transmissions are usually rated at the maximum speed for safe operation at maximum working pressure. The permissible speeds at lower working pressures are considerably higher, however, although as will be explained hereafter prior constructions have been of necessity limited to the maximum speed for safe operation at maximum working pressure.

Referring now to Fig. 8 there is represented two plots of typical operating conditions as applied to a hydraulic transmission for a draw-works drive wherein the load in tons of drill stem or equivalent weight which the hoist drum must lift through the block and falls is plotted horizontally while the pump and motor strokes in per cent, pump and motor speed in revolutions per minute, and operating pressure in pounds per square inch are plotted vertically. It will be seen that the load in tons and consequently the torque on the output shaft of the hydraulic motor varies over a range of 5 to 1, that is the maximum load is five times the minimum. If the weight is to be raised at a speed which requires the same horsepower for any weight of drill stem, the speed of the hydraulic motor necessary for any given weight of drill stem is represented by the composite solid and dot-dash curve of motor speed. This curve is such that at any point thereon the product of the horizontal coordinate, that is the load in tons, by the vertical coordinate, that is the speed in revolutions per minute, is a constant value. As a numerical example, neglecting losses, for 303 horsepower the speeds indicated on the plot require a ratio between the motor and the drill stem of 3.5 revolutions per foot of vertical motion of the drill stem so that starting from the bottom of a finished hole with 100 tons of drill stem, 303 horsepower will be required to raise the stem at 50 feet per minute or 175 revolutions per minute of the motor shaft while at the lightest load of 20 tons represented by the last section of drill stem plus the traveling block and associated mechanism, 303 horsepower is utilized in raising the stem at 250 feet per minute or 875 revolutions per minute of the motor shaft.

If a size of power transmission be selected which is feasible for use in a draw-works drive from the standpoint of first cost, bulk and weight, the maximum pressure at which such a transmission may be operated and the minimum motor speed determine the horsepower which will be developed. In the example of Fig. 8 the maximum pressure has been assumed as 1,000 pounds per square inch, and the minimum motor speed as 175 revolutions per minute. The range of speed ratios required, namely 5 to 1, requires a range of stroke variation in either the pump or the motor between 20% and 100%.

In operating a transmission of this character at constant horsepower over the range of speeds indicated, two methods of varying the speed are available. The first method, and the more usual one, is by varying the pump displacement in proportion to the speed required for any load, while the motor displacement remains fixed. The various conditions of operation by this method are indicated by the dot-dash lines in Fig. 8. It will be noted that starting at the right of the figure with 100 tons load, the working pressure is at the limit of 1,000 pounds per square inch and that in order to get the 5 to 1 range in speeds the pump must be run at 20% stroke for a motor speed of 175 revolutions per minute necessitating a pump speed of 875 revolutions per minute for all loads. The limiting condition with such operation is at the right hand side of the plot wherein the pump running at the high speed of 875 revolutions per minute is subjected to pressures in the neighborhood of 1,000 pounds per square inch, which is beyond the safe operating pressure at that speed. In other words, the variable displacement pump portion of the hydraulic transmission is subject simultaneously to peak operating speed and peak pressure when the drill stem load is near its upper limits.

The other method of operation by which constant horsepower may be transmitted over the selected range in speed ratios is by using a constant displacement pump and a variable displacement motor. The conditions for this method are plotted in Fig. 8 by solid lines from which it will be seen that the limiting condition so far as simultaneous high speed and high pressure are concerned is at the left-hand side of the plot where the motor speed is high at 875 revolutions per minute and the pressure is likewise high, being maintained constant at 1,000 pounds per square inch throughout the full operation. In addition, in order to cover the full range of speeds it is necessary for the motor stroke to reach in this instance a low value of 20% which is so close to the friction angle as to make such operation unfeasible due to the extremely low efficiency at such small motor strokes. It will, therefore, be seen that neither of these methods of operating at constant horsepower over the 5 to 1 range of speed ratios is satisfactory since both require operation of the transmission with simultaneous imposition of maximum operating pressure and maximum operating speed on one of the units of the transmission. For satisfactory operation with either method it is necessary to at least double the size of machine having the same limits of pressure and speed whereby either the peak speed or the peak pressure or both may be reduced and still transmit the required horsepower. The size actually necessary in a typical drilling rig installation for such operation is entirely prohibitive from the standpoints of bulk and weight as well as first cost with transmissions of the best speed and pressure ratings at present available.

According to the present invention these difficulties are avoided and the size of machine necessary to satisfactory operation is considerably reduced by making both the pump and the motor of variable displacement and operated with fixed motor displacement and variable pump displacement over one range of load and with fixed pump displacement and variable motor displacement over another range of load. Fig. 9 represents a plot of operating characteristics under these conditions, the values being plotted on the same scale as in Fig. 8.

If in the range between 50 and 100 tons load, the motor be operated at full displacement as indicated in the dot-dash curve and the pump displacement be varied from 100% at 50 tons down to 50% at 100 tons by suitable control mechanism, the pump may be operated at approximately the speed necessary to raise 50 tons load with 303 horsepower which is 350 revolutions per minute in the example selected. In this range of operation the operating pressure increases from 500 pounds per square inch at 50 tons load to 1,000 pounds per square inch at 100 tons load. It will be noted that at peak operating pressure the pump is operating at a comparatively low speed of approximately 350 revolutions per minute. In the range of from 20 to 50 tons load, the pump displacement is maintained fixed at 100% and the motor displacement reduced from 100% to 40%, thus raising the motor speed as the load decreases to approximately 875 revolutions per minute at 20 tons load. In this range of operation the working pressure is constant at 500 pounds per square inch so that when the motor is operating at the high speed of 875 revolutions per minute, it is subjected to only half the maximum operating pressure.

In making the transition from one range of operation to the other, it is necessary to provide some means for transferring the control from one mechanism to another. This is preferably accomplished by operating at 100% stroke on both the pump and the motor over a small range of load, for example from 49 tons to 51 tons and causing the prime mover to fall off in speed slightly as the load increases over this range. It will be seen that with this method of operation neither the pump nor the motor is subjected simultaneously to maximum operating pressure at maximum speed so that the preformance of a given size transmission at constant horsepower is extended over a far greater range than possible by other methods of operation.

Referring now to Figs. 2 and 7 the power transmission and control system therefor includes a stroke varying hydraulic motor 70 for the variable displacement pump 26 and a stroke varying hydraulic motor 72 for the variable displacement motor 22. The motor 22 and pump 26 are illustrated as of the well-known "Waterbury" construction comprising revolving cylinder barrels 74 within which pistons 76 are reciprocated by the motion of socket rings 78 which revolve in tilting boxes 80 and 82. The tilting box 80 carries a stud 84 having a pivoting and sliding connection with a differential piston 86 mounted in cylinder bores 88 and 90 of the hydraulic motor 70. The bore 90 is subjected to a constant fluid pressure from an auxiliary pump 92 through a conduit 93 while the bore 88 is subjected to either pressure from the pump 92 or to atmospheric pressure in accordance with the movement of certain control valves later to be described.

The tilting box 82 carries a stud 94 having a pivoting and sliding connection with a differential piston 96 reciprocable in bores 98 and 100 of the fluid motor 72. The bore 100 is subjected to constant pressure from the pump 92 through a conduit 101 while the bore 98 is subjected either to auxiliary pump pressure or to atmospheric pressure in accordance with the movements of a pressure responsive pilot valve 102. A movable valve member 104 of the pilot valve 102 is mounted in a bore 106 of the pilot valve 102 and has a reduced diameter stem 108 projecting through the bottom wall of the bore 106 and carries two piston heads 110 and 112. The lower end of the bore 106 is in communication through a conduit 114 with the working circuit of the hydraulic transmission, preferably through a shuttle valve 116, as indicated in Fig. 3, whereby the side of the working circuit which is of higher pressure at any instant is placed in communication with the lower end of the bore 106. An adjustable spring 118 urges the valve member 104 downwardly against the pressure exerted in the lower end of the bore 106. A passage 120 is normally closed by the piston 112 and is open to the atmospheric pressure at the interior of the case of the motor 22 through a passage 122 when valve member 104 moves downwardly while communication is established between passage 120 and the auxiliary pump through a conduit 124 when the valve 104 is moved upwardly.

The fluid motor 70 is under the control of a manually operable valve 126 which is normally biased to neutral position by centering springs 128. Valve 126 is provided with a central bore 130 within which a pair of piston heads 132 and 134 may be moved to place a conduit 136 in communication either with a conduit 138 leading from the outlet of the auxiliary pump 92 or with a conduit 140 leading to the atmospheric pressure side of the system. In series with the valve 126 and conduit 136 is a speed governor operated valve 142 having a bore 144 within which a piston valve member 146 may be moved to place a conduit 148 in communication either with the conduit 136 or with the interior of the casing of the pump 26 through passages 149 and 150 formed in piston 146 and the body of the valve 142 respectively. The piston has a projecting stem 152 which is operatively connected to an arm 154 of a speed governor 156 which may be of any well-known construction and forms no part of the present invention per se.

A third valve 158 is provided having a bore 160 within which a piston valve 162 reciprocates and controls communication between a conduit 164 leading to the bore 88 and either the conduit 148 or the interior of the casing of the pump 26 through a conduit 166 formed in the piston valve 162. A conduit 168 communicates between the lower end of bore 160 and the shuttle valve 116 while an adjustable spring 170 similar to the spring 118 of valve 102 serves to make the piston 162 responsive to the pressure in the main working circuit. For the purpose of maintaining the motor shaft stationary when the tilting box 80 of the pump 26 has been brought into the vicinity of zero stroke without requiring tedious manual adjustment to prevent creeping of the motor shaft, means is provided for directing fluid from the auxiliary pump 92 to the main working circuit of the transmission as required to maintain the motor shaft stationary. For this purpose an anti-creep valve 172 is provided at one end of the casing of the fluid motor 22. Valve 172 comprises a central bore 174 within which is slidably mounted a duplex piston valve 176 for controlling the admission of pressure fluid from the conduit 178 through either a conduit 180 leading to one valve port 182 of the hydraulic transmission or to a conduit 184 leading to the other valve port 186 of the transmission. Valve 176 also controls communication between an exhaust conduit 188 and branches 190 and 192 of the conduits 180 and 184 respectively. Exhaust conduit 188 leads to a port 194 formed in the bore 90 of the fluid motor 70 and with the tilting box in the neutral position illustrated registers with a passage 196 formed in the piston 86 so that when the tilting box 80 is in or near neutral position passage 188 is in open communication with the interior of the casing of the pump 26.

The conduit 178 leads to a port 198 formed in the bore 130 of the valve 126. An auxiliary piston 200 of the valve 126 controls communication between the port 198 and a port 202 leading from the auxiliary pressure conduit 138. The pistons 134 and 200 are adapted to close communication between the ports 198 and 202 whenever the valve 126 is moved out of neutral position sufficiently to open communication between the conduit 136 and either the conduit 138 or the conduit 140.

The auxiliary pump 92 is driven from the shaft 28 of the pump 26 by a belt drive 204 (Fig. 6) while the speed governor 156 is driven from the pump 92 through a belt drive 206. The valve 172 is operated in accordance with the direction of movement of the motor shaft 24 through a spring loaded friction clutch 208 (Fig. 2) having a driven ring 210 which carries a stud 212 having a pivoting and sliding engagement with piston 176. The interior of the casings of the pump 26 and the motor 22 and the inlet side of the pump 92 are in open communication with an expansion tank 214 as is well known in the art. A relief valve 216 is provided for limiting the pressure developed in the outlet conduit of the auxiliary pump 92.

The speed governor 156 is so adjusted as to raise the valve 146 upon a decrease in speed below the speed corresponding to the maximum power speed of the prime movers 34 and 42 and to lower the valve to the position illustrated upon an increase to that speed. The spring 170 of the valve 158 is adjusted to hold the valve downwardly in the position illustrated at all safe normal operating pressures within the main working circuit of the transmission and to permit the valve 162 to move upwardly only when safe operating pressures are exceeded. For the example illustrated in Fig. 9 this setting would be just over 1,000 pounds per square inch. The valve 162 is adjusted to regulate to a pressure corresponding to that developed at full stroke of the motor and full stroke of the pump, that is in the example illustrated in Fig. 9, 500 pounds per square inch. The sensitivity of the speed governor 156 is preferably much less than the sensitivity of the speed governors which are customarily provided on Diesel engines 34 and 42 so that the engine governors are permitted to respond fully to any change in speed before the governor 156 exercises control over the valve 142.

In operation of the device as used for hoisting drill stem the clutches 36 and 38 will both be engaged so that the two engines 34 and 42 are compounded to drive the shaft 32. The clutches 52 and 54 will both be disengaged so that the slush pumps 44 and 46 will be stopped and the clutch 58 will be disengaged so that the pump 56 and the motor 64 will not be operating. With clutch 16 engaged the operator may move the control handle 218 to move the valve 126 to the right in Fig. 3 closing off communication between the ports 198 and 202 and opening communication between the conduits 136 and 138. Assuming the string of drill stem to be the full length of a nearly completed well and that the weight to be lifted is in the range between 50 and 100 tons, the auxiliary pressure fluid admitted from the conduit 138 passes through the valve 126 through the conduit 136 and to the valve 142. Since at the instant this path is opened, the tilting box 80 is in neutral position, the engines 34 and 42 will be idling so that the valve 142 is in the down position, the fluid is permitted to pass through the conduit 148, whence it passes through valve 158 to the cylinder 88. The valve 158 will be in its lower position at this time due to the lack of excessive pressure in the main fluid circuit of the transmission.

The piston 86 is therefore moved to the right increasing the stroke of the pump 26 until a value is reached such that the speed at which the drill stem is being hoisted is sufficient to impose the full power load on the engines 34 and 42. For purposes of comparison it may be assumed that the pump shaft 28 is rotating, top away from observer in Figures 2 and 6, and thus this movement of the tilting box causes fluid to be delivered into port 182 and withdrawn from port 186. This in turn rotates the motor shaft 24 in the opposite direction. Further movement of the piston 86 to the right beyond this point will cause the engines 34 and 42 to slow down somewhat thus causing the governor 156 to lift the valve 142 and connect the conduit 148 to the exhaust through conduits 149 and 150. The valve 142 thus limits the movement of the piston to the right and thereby regulates the stroke of the pump 26 to the proper value necessary to maintain the constant peak horsepower speed at the prime movers 34 and 42. The drill stem is accordingly raised at the fastest possible speed and as the top of the stem approaches the top of the derrick, the operator will move the handle 218 fully to the left thus opening communication between the conduits 136 and 140. The cylinder 88 is thereby connected to the exhaust through conduit 164, valve 158, conduit 148, valve 142, conduit 136, valve 126 and conduit 140. The auxiliary pump pressure constantly exerted in the cylinder 90 forces the piston 86 to the left bringing the tilting box 80 into the vicinity of neutral position.

As the operator sees that the drill stem is stopping he releases the handle 218 permitting it to move to neutral position wherein the conduit 136 is blocked and communication is established between the ports 198 and 202. The anticreep valve 172 thereupon operates to connect the main circuit of the transmission to the outlet of the auxiliary pump 92 and to the exhaust side of the system in the proper direction to counteract any small rate of fluid delivery by the pump 26. Thus, if the pump tilting box should be out of neutral slightly, in a position tending to cause the shaft 24 to rotate counterclockwise in Figure 3, the valve 176 will be slowly moved to the left until a connection is established between conduit 178 and conduit 184, thus admitting pressure oil from the auxiliary pump 92 through conduit 138, ports 202 and 198 of valve 126, conduit 178, valve 172, conduit 184, to the port 182 of the main transmission. As the valve 176 continues to move to the left, the opening between conduits 178 and 184 is progressively increased as is also the opening between conduit 190 and conduit 174. The effect of the increased opening at conduit 184 is to increase the pressure applied to port 182 by the auxiliary pump 92. The effect of the increased opening at conduit 190 is to decrease the pressure applied to port 186 by the main pump 26. As soon as a point is reached where these two pressures are equal, the motor 22 will cease to turn, and the valve 176 will remain in its adjusted position.

It will be understood, of course, that when the operating handle 218 is first released and the pump tilting box brought to approximate neutral position, the shaft 24 will have been turning, and that the spool 176 will lie on either one side or the other of neutral position depending upon whether the handle 218 was released from a hoisting or from a lowering position. As soon as the pump tilting box reaches nearly neutral position, however, port 196 is opened, thus permitting the pressure in ports 182 and 186 to become balanced as above described. It will be seen that, should the valve spool 176 be in its extreme lefthand position when the handle 218 is released, and when port 196 opens to port 194, then the conduit 184 will be wide open and will produce a higher pressure in port 182 than the pump 26 produces in port 186. Thus the motor 22 will tend to rotate clockwise shifting the spool 176 to the right until the balance of pressures in the two main ports is again achieved. The draw-works is thus maintained stationary until such time as the operating handle 218 is again operated.

During the raising of the drill stem at constant horsepower as above described the valve 102 is lifted soon after the tilting box 80 leaves neutral position and inasmuch as the operating pressure for loads above 50 tons is above 500 pounds per square inch, the valve 102 will remain in the upward position and tilting box 82 will be moved immediately to full stroke during the entire period of hoisting, and so long as the weight of the stem is on the draw-works drum 12. The stem may be "inched" down by a small movement of the lever 218 to the left thus exhausting a small quantity of fluid from the cylinder 88 and moving the tilting box 80 into a small stroke in the reverse direction. The slips or wedges in the drill table 68 having been locked by this movement, the exposed sections of drill stem may be removed in the usual manner and the hook lowered by further operation of the lever 218 in a manner similar to but opposite to that described for hoisting. Since the load is negligible in lowering the hook, the motor 22 remains at minimum stroke and the speed of lowering is thus at maximum. With loads near the upper limit of 100 tons the rate of travel of piston 86 may cause acceleration of the drill string at a rate which would impose excessive pressure on the system. Likewise, should the drill stem become caught in the hole for any reason, excessive pressures may be developed. Whenever, due to any cause, the working pressure exceeds the safe value, valve 162 is lifted against spring 170 thus exhausting fluid from cylinder 88 until a safe operating pressure is reached.

As each section of drill stem is removed from the string the piston 86 moves further to the right at each hoist before governor 156 operates the valve 142 to stop further movement of the piston 86. When the weight of the drill string reaches approximately 51 tons, the piston 86 moves to the right to its full stroke. Thereafter for one or two successive hoists the transmission operates at 1 to 1 ratio and the speed of the prime movers 34 and 42 is permitted to increase slightly while the operating pressure in the main transmission circuit drops to 500 pounds.

As the drill stem weight further decreases, the valve 102 comes into operation and prevents the working pressure from dropping below 500 pounds by decreasing the stroke of the motor 22 as required to maintain the operating pressure at that value. Thus, as soon as the operating pressure drops to 500 pounds the spring 118 is able to overcome the force of the fluid in the lower end of the bore 108 and move the valve 104 downwardly thus opening the cylinder 88 to the exhaust side of the system through conduits 120 and 122. The auxiliary pump pressure constantly exerted at the cylinder 100 thus moves the piston 96 to the right decreasing the stroke of the motor 22 until the operating pressure is maintained at 500 pounds. As successive sections of the string are removed, the piston 96 is moved further and further to the right until at the minimum load on the draw-works drum of 20 tons the motor is brought to minimum stroke of 40%.

At this point the cutter bit may be removed and replaced and the drill stem fed back into the well according to the usual procedure of dropping it by disengaging clutch 16 and stopping it with the brakes 20. The empty hook may be raised at maximum speed by operating the control lever 218 as previously described. When the entire string has been again fed into the well, one of the clutches 52 or 54 may be engaged to start one of the slush pumps and the clutch 58 engaged to start the rotary table 68. Adjustment of the speed of rotation of the table 68 may be accomplished by manually operating the stroke regulator of the pump 56. The feeding of the drill stem into the hole as drilling proceeds may be taken care of in any of the usual manners, such as by holding a portion of the weight of the stem on the brakes 20.

If desired, the lowering of the drill string into the hole may be accomplished by using the hydraulic transmission and the Diesel engines to retard the fall of the string instead of the brakes 20. For operation in this manner, when a section of drill stem has been attached to the string, the handle 218 is moved slightly to the right to "inch" the string upwardly, releasing the slips. The handle 218 is then moved to the left connecting conduit 136 to the return conduit 140. Fluid is thereby released from the bore 88 through conduit 164, valve 158, conduit 148, valve 142, conduit 136, valve 126, and conduit 140 until either the pump 26 is brought to full stroke in a lowering direction or until the handle 218 is returned to neutral position. The drill stem thus descends under its own weight, the Diesel engines 34 and 42 being speed up above their normal speed and acting as compression brakes. Before the end of the downward travel is reached the handle 218 is moved fully to the right causing fluid pressure to be admitted to bore 88 through conduit 138, valve 126, conduit 136, valve 142, conduit 148, valve 158, and conduit 164. The pump tilt box is thereby moved toward neutral decreasing the mechanical advantage of the drill string over the prime movers and thus multiplying the braking effect thereof. With a drill string weight of less than fifty tons the motor stroke is maintained at a value less than full stroke and such that five hundred pounds per square inch pressure is maintained in the system as a result of the operation of the valve 102. During the retarding portion of the lowering cycle the pressure will tend to rise due to the increased force required to decelerate the drill string so that the motor stroke will increase. This further tends to decrease the mechanical advantage of the drill string over the prime movers. With a drill string weight of over fifty tons the motor is always at full stroke whenever the weight of the drill string is on the drum so that the reserve braking effort which can be carried through the transmission is in proportion to the difference between the pressure created by the drill string weight and the pressure at which valve 158 lifts. At loads near the upper limit the lever 218 must be operated to the right for retarding the fall at an earlier point than with lighter loads. If desired the brakes 20 may be used to assist the prime movers in stopping the load at the end of the descent.

While the form of embodiment of the invention as herein disclosed, constitutes a preferred form, it is to be understood that other forms might be adopted, all coming within the scope of the claims which follow.

What is claimed is as follows:

1. In a variable speed power transmission system the combination of a prime mover, a variable displacement pump driven by the prime mover, a variable displacement motor driven by the pump, a load device driven by the motor and imposing a variable torque load thereon, means responsive to load variations for varying the pump displacement while maintaining the motor displacement constant in a manner to maintain a substantially constant power load on the prime mover over one range of load torque at the motor, and means responsive to load variations for varying the motor displacement while maintaining the pump displacement constant in a manner to maintain a substantially constant power load on the prime mover over another range of load torque at the motor.

2. In a variable speed power transmission system the combination of a prime mover, a variable displacement pump driven by the prime mover, a variable displacement motor driven by the pump, a load device driven by the motor and imposing a variable torque load thereon, means for varying the displacement of the pump, means for varying the displacement of the motor, and a load responsive control system for both said means operable to cause the motor speed to vary with load torque at the motor in a manner to maintain a substantially constant power load on the prime mover.

3. In a variable speed power transmission system the combination of a prime mover, a variable displacement pump driven by the prime mover, a variable displacement motor driven by the pump, a load device driven by the motor and imposing a variable torque load thereon, means responsive to the speed of the prime mover for varying the pump displacement while maintaining the motor displacement constant in a manner to maintain a substantially constant power load on the prime mover over one range of load torque at the motor, and means responsive to fluid pressure developed in the motor for varying the motor displacement while maintaining the pump displacement constant in a manner to maintain a substantially constant power load on the prime mover over another range of load torque at the motor.

4. In a draw-works drive for a well drilling rig the combination of a prime mover, a draw-works drum, a fluid pump driven by the prime mover, a fluid motor driven by the pump and driving the draw-works drum, operator controlled means for controlling the delivery of fluid to the motor, and means responsive to movement of the motor and automatically operative upon movement of the operator controlled means to drum-stopping position for directing fluid to the motor in a manner to bring the drum to rest from a slow speed operation.

5. In a variable speed power transmission system the combination of a prime mover, a variable displacement pump driven by the prime mover, a fluid motor driven by the pump, a load device driven by the pump, a second fluid motor for varying the displacement of the pump, a valve movable between three positions in the first of which the second motor is rendered operative to vary the pump displacement in one direction in the second of which the second motor is rendered operative to vary the pump displacement in the opposite direction and in the third position of which the fluid motor is non-responsive to said valve, a second valve responsive to the direction of movement of the first motor and connections between said valves whereby when the first valve is in the third position the second valve is rendered operative to control delivery of fluid to the first motor for maintaining the first motor stationary.

6. In a variable speed power transmission the combination of a prime mover, a pump driven by the prime mover, a fluid motor driven by the pump, a load device driven by the motor, means for controlling the flow of fluid delivered by the pump to the motor, an anti-creep valve operated in accordance with the direction of movement of the motor for causing operation of the motor oppositely to the movements causing operation of the anti-creep valve, and means connected for concurrent operation with the flow controlling means for inhibiting effective operation of the anti-creep valve when the flow controlling means is operated to cause movement of the motor.

7. In a variable speed power transmission system the combination of a prime mover, a variable displacement pump driven by the prime mover, a fluid motor driven by the pump, a load device driven by the motor, a second fluid motor for varying the displacement of the pump, a means for controlling the flow of pressure fluid to said second motor, an anti-creep valve operated in accordance with the direction of movement of the first motor for directing fluid to the first motor in a direction opposite to the movements causing operation of the anti-creep valve, and means connected with the flow controlling means for inhibiting effective operation of the anti-creep valve when the flow controlling means is operated to cause movement of the second motor.

EDWIN L. ROSE.